(12) United States Patent
Calatrava-Requena et al.

(10) Patent No.: US 6,748,229 B1
(45) Date of Patent: Jun. 8, 2004

(54) METHOD AND APPARATUS FOR MOBILE TELECOMMUNICATION

(75) Inventors: Odelin Calatrava-Requena, Madrid (ES); Susana Fernández-Alonso, Madrid (ES)

(73) Assignee: Telefonaktiebolaget LM Ericsson, Stockholm (SE)

( * ) Notice: Subject to any disclaimer, the term of this patent is extended or adjusted under 35 U.S.C. 154(b) by 472 days.

(21) Appl. No.: 09/625,584

(22) Filed: Jul. 26, 2000

Related U.S. Application Data

(63) Continuation of application No. PCT/IB00/00946, filed on Jul. 13, 2000.

(51) Int. Cl.[7] .................................................. H04Q 7/20
(52) U.S. Cl. .................... 455/466; 455/445; 455/417; 455/414; 455/426.1; 455/550.1; 455/412.1
(58) Field of Search ............................... 455/466, 412, 455/414, 433, 432, 403, 422, 435, 560, 566, 445, 417, 426.1, 550.1, 412.1

(56) References Cited

U.S. PATENT DOCUMENTS

| | | | | |
|---|---|---|---|---|
| 5,787,357 A | * | 7/1998 | Salin ......................... | 455/466 |
| 5,819,178 A | | 10/1998 | Cropper | |
| 5,878,397 A | * | 3/1999 | Stille et al. ................. | 455/466 |
| 5,903,726 A | | 5/1999 | Donovan et al. | |
| 5,946,630 A | * | 8/1999 | Willars et al. .............. | 455/466 |
| 6,044,275 A | * | 3/2000 | Boltz et al. ................. | 455/466 |
| 6,108,559 A | * | 8/2000 | Åström et al. .............. | 455/466 |
| 6,208,870 B1 | * | 3/2001 | Lorello et al. .............. | 455/466 |
| 6,263,212 B1 | * | 7/2001 | Ross et al. .................. | 455/466 |
| 6,289,223 B1 | * | 9/2001 | Mukherjee et al. ......... | 455/466 |
| 6,370,390 B1 | * | 4/2002 | Salin et al. ................. | 455/466 |
| 6,493,558 B1 | * | 12/2002 | Bernhart et al. ............ | 455/466 |
| 6,510,323 B1 | * | 1/2003 | Stocker et al. .............. | 455/466 |

FOREIGN PATENT DOCUMENTS

| | | |
|---|---|---|
| EP | 0 883 318 A1 | 12/1998 |
| EP | 0 936 825 A | 8/1999 |
| WO | 95/12292 A | 5/1995 |
| WO | 99/57914 A2 | 11/1999 |

* cited by examiner

*Primary Examiner*—Vivian Chin
*Assistant Examiner*—Marceau Milord
(74) *Attorney, Agent, or Firm*—Burns, Doane, Swecker & Mathis, L.L.P.

(57) ABSTRACT

Method and apparatus for Short Message Service between a first mobile station subscribed to a first Public Land Mobile Network, and a second mobile station subscribed to a second Public Land Mobile Network, wherein said first Public Land Mobile Network and said second Public Land Mobile Network may be based on different standards, wherein the step of forwarding the Mobile Terminating Short Message from a Short Message Service node such as a Service Center SC or Message Center MC toward the second Mobile Station includes the use of an Interworking Short Message Center IMSC, which interrogates a Home Location Register of the second Public Land Mobile Network in order to obtain routing information.

17 Claims, 6 Drawing Sheets

METHOD AND APPARATUS FOR MOBILE TELECOMMUNICATION

This application is a continuation on international application No. PCT/IB00/00946, filed Jul. 13, 2000.

BACKGROUND

The invention relates to a method and apparatus to be used in a mobile telecommunication system, for allowing inter-working of Short Message Services (hereinafter: SMS) between two Public Land Mobile Networks (hereinafter: PLMN) based an different standards, such as American standard versus Pan-European standard, or American standard versus Pan-Universal standards, and different mobile system generations.

More specifically, the present invention provides the necessary steps and means to allow the exchange of Short Messages between mobile users subscribing to mobile networks (PLMN) based on different standards and mobile system generations.

The mobile telephony has expanded greatly in recent years, and not only the mobile telephony as such, but also the data transmission and new emerging services in scenarios characterized by mobility. In parallel, and as a direct consequence of this huge market growth, different new technologies turn up, which further derive in new standards, on which different systems are based, and which different operators take into operation to offer a new generation of services.

Still another consequence of this expansion and continuous appearance of new technologies and standards is the evolution towards new generations of mobile systems and services.

Such an evolution is not carried out simultaneously for an entire system; instead, the evolution normally affects different parts of a system to a different extent, so that some parts of the system may be modified to a great extent or even replaced by completely new parts, whereas other parts of the system are not substantially affected or not affected at all by this evolution. Besides, national or other regulations force in some cases the operators to follow a particular standard, or at least, to introduce particular features which imply a different standard de facto.

As a result of this evolution, networks are sometimes identified by the systems on which said networks are based, whereas systems are sometimes identified by the latest technology that said systems have incorporated. Moreover, in some cases, networks are identified by said technology lately incorporated, even though such a technology just applies to a specific part of the system.

For example, the evolution from the $2^{nd}$ generation (hereinafter referred as 2G) of some mobile systems to their corresponding $3^{rd}$ generation (hereinafter referred as 3G) is a quite illustrative example of this naming principles. In particular, the American standard Digital Advanced Mobile Phone System (hereinafter: D-AMPS), the Pan-European standard Global System Mobile (hereinafter: GSM), or the Japanese standard Personal Digital Communication (hereinafter: PDC), are all 2G systems using the access technology known as Time Division Multiple Access (hereinafter: TDMA). However, the evolution of the two former mobile systems towards their respective 3G deserves some additional explanation.

On the one hand, GSM 3G essentially assumes the new Pan-Universal standard known as Universal Mobile Telecommunications System (hereinafter: UMTS) wherein the access technology proposed is the Wide-band Code Division Multiple Access (hereinafter: WCDMA). However, some technical communities and Telecommunication fora do not distinguish between access and other application layers, and they indistinctly refer to UMTS or WCDMA networks irrespective of whether the subjet refers to the access or to other issues. In addition, most of the Japanese mobile operators have also selected WCDMA to offer 3G services.

On the other hand, different trends turn up for the Pan-American 3G mobile systems. In principle, D-AMPS 3G assumes as the access technology the proposal from the Universal Wireless Radio Access Consortium in favor of American mobile standard IS-136 (hereinafter: UWC-136). Said UWC-136 belongs to the family of standards known as TDMA. In a manner analogous with the UMTS/WCDMA case mentioned above, some technical communities and Telecommunication for a indistinctly refer to D-AMPS 3G, or UWC-136, or simply TDMA networks, irrespective of whether the subject refers to the access or to other issues. Moreover, other American communities propose narrow-band air digital interfaces known as CDMA2000 for a standard system of 3G services. This CDMA2000 belongs to the family of standards known as Code Division Multiple Access (hereinafter: CDMA). Still further, efforts are made to develop what has been named the North American WCDMA (hereinafter: NA:WCDMA).

Nowadays, the International Mobile Telecommunications 2000 (hereinafter: IMT-2000) is an initiative of International Telecommunication Union (ITU) to provide radio access to a world wide telecommunication infrastructure through terrestrial and satellite systems. Said IMT-2000 proposes a multiple access structure for the radio interface wherein all the air interfaces will share a common core network. Such a common core network has not been achieved yet, but efforts are being made for this purpose. At present, IMT-2000 covers the development of the standard families referred to above, such as TDMA and CDMA.

The greater the variety of standards and mobile system generations are, the higher the need to provide for inter-working between them. In this respect, there are many aspects to consider when talking about inter-working.

The amount of different aspects to be taken into consideration in order to assure compatibility between networks based on different standards, makes the operators and suppliers of such networks to prioritize the most important aspects versus other aspects that are not so essential, not so attractive, or with lower commercial interest. For example, communication between subscribers belonging to a certain network but who are roaming in a network based on a different system and standards, or voice communication between subscribers to networks based on different standards, are aspects of a high priority and, consequently, the corresponding problems have already been solved in different manners.

However, one problem not previously solved relates to the exchange of Short Messages between users of networks based on different standards or different technologies.

The Short Message Service (hereinafter: SMS) provides for the transfer of Short Messages between a first Short Message Entity (SME-1) and a second Short Message Entity (SME-2) via a Short Message Service Center (hereinafter: SMSC). The Short Message Entity (hereinafter: SME) is an entity able to compose and decompose and send and receive Short Messages. For example, a Mobile Station (hereinafter: MS) is a sort of mobile SME that under some standards (like IS-41) is known as an MS-based SME. The Short Message Service Center (SMSC) is an intermediate entity for most of the mobile systems, in charge of storing Short Messages from originating users before said Short Messages being delivered to the destination users. The constitution of the SMSC is not always the same, as many important features of the SMSC depend on the specific standard on which the PLMN of the SMSC is based. For instance, the SMSC is supported in GSM 2G, or UMTS, or WCDMA networks by the Service Center (hereinafter: SC), which communicates with said GSM 2G, or UMTS, or WCDMA networks by means of a well-defined and known protocol and interface. However, such an SMSC is supported in D-AMPS or, more recently, in TDMA or CDMA2000 networks, by the Message Center (hereinafter: MC), which communicates with said D-AMPS, or TDMA, or CDMA2000 networks by means of another well-defined and known protocol, though different than the previous one.

The Short Message Services comprise two basic services:

Short Message Mobile originated (hereinafter SM-MO); and

Short Message Mobile Terminating (hereinafter SM-MT).

Short Message Mobile Originated (SM-MO) denotes the capability of the system to transfer a short Message submitted from a SME (the originating SME can be a mobile station and is hereinafter sometimes simply referred to as MS-1) to an SMSC and to provide information about the delivery of said Short Message.

Short Message Mobile Terminating (SM-MT) denotes the capability of the system to transfer a Short Message submitted from the SMSC to one SME (this receiving SME can be a mobile station and is hereinafter sometimes simply referred to as MS2) and to provide information about the delivery of said short message.

For more details about the SMS in GSM Systems, the interested reader is referred to GSM T.S. 03.40.

Nevertheless, and for the sake of clarity, the two basic services comprised by SMS, SM-MO and SM-MT, are hereinafter described for the two main groups of networks referred to above, whose protocols, interfaces and signaling flows are not compatible enough to automatically allow the exchange of Short Messages between their respective users.

An example of a first main group can be a PLMN based on a GSM 2G standard. Another example of a first main group can be a PLMN based on a UMTS standard that is considered to be a third generation of mobile systems, and which can also be referred as a WCDMA network. For simplicity reasons, this group will be referred to hereinafter as a GSM/UMTS/WCDMA PLMN in a non-restrictive manner, intended to also encompass other networks or network designations, whose interfaces, methods, entities, or protocols, as concerned by the scope of the present invention, can be easily matched with the ones in this group by anyone skilled in the art.

An example of a second main group can be a PLMN based on D-AMPS standard, sometimes simply referred to as a TDMA network. Another example of a second main group can be a PLMN based on a standard like the UWC-136, or based on a standard like the CDMA2000, both of them valid for the third mobile system generation. Also for simplicity reasons, this second group will be referred to hereinafter as a TDMA/D-AMPS/CDMA2000 PLMN in a non-restrictive manner, intended to encompass other networks or network designations, whose interfaces, methods, entities, or protocols, as concerned by the scope of the present invention, can be easily matched with the ones in this group by anyone skilled in the art. For example, the already cited network UWC-136 is assumed to belong to this second group.

Figure 1:
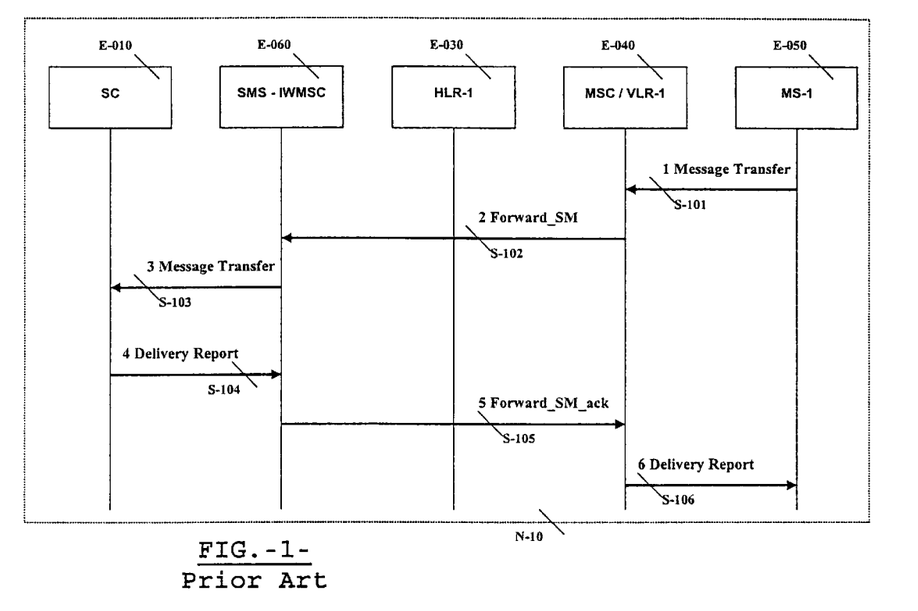
FIG. 1 illustrates a prior art Short Message related signaling flow in a GSM/UMTS/WCDMA PLMN, for Mobile Originated Short Messages.

The SM Mobile Originated (SM-MO) service for a GSM/UMTS/WCDMA PLMN (N-10) is schematically illustrated in FIG. 1. The signaling flow in accordance with FIG. 1 is as follows:

1. The Mobile Station MS-1 (E-050) transfers a Short Message to the Mobile Switching Center (E-040) by means of a "Message Transfer" signaling message (S-101). This Mobile Switching Center (hereinafter: MSC) could be a standalone MSC or collocated with a Visitor Location Register (hereinafter: VLR) wherein subscriber data are stored for subscribers currently roaming in the area served by said VLR. When the MSC and the VLR are collocated, they are represented by an entity referred to as MSC/VLR. For the purpose of the present invention, the Mobile Switching Center is hereinafter referred to as MSC/VLR, irrespective of whether it is standalone or collocated. The MSC/VLR receiving the SM from the MS-1 is referred to hereinafter as MSC/VLR-1.

2. The MSC/VLR-1 (E-040) transfers the Short Message to the Short Message Service Inter-working MSC (hereinafter: SMS-IWMSC) (E-060) by means of a "Forward_SM" signaling message (S-102).

3. The SMS-IWMSC (E-060) transfers the Short Message to the Service Center (SC) (E-010) by means of a "Message Transfer" signaling message (S-103).

4. The SC (E-010) reports the outcome of the transfer of the Short Message to the SMS-IWMSC (E-060) by means of a "Delivery Report" signaling message (S-104).

5. The SMS-IWMSC (E-060) reports the outcome of the transfer of the Short Message to the MSC/VLR-1 (E-040) by means of a "Forward_SM_ack" signaling message (S-105).

6. The MSC/VLR-1 (E-040) reports the outcome of the transfer of the short Message to the MS-1 (E-050) by means of a "Delivery Report" signaling message (S-106).

Figure 2:
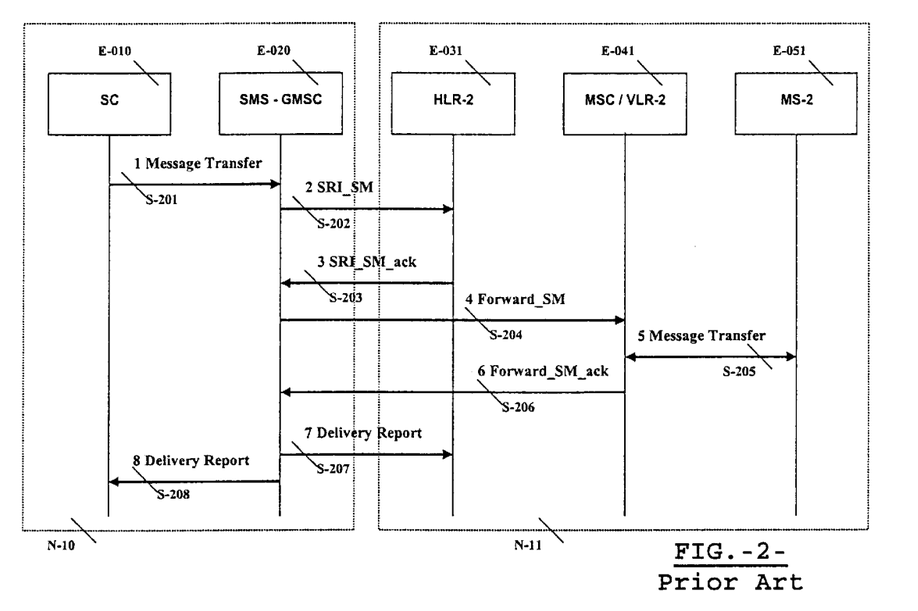
FIG. 2 illustrates a prior art Short Message related signaling flow in a GSM/UMTS/WCDMA PLMN, for Mobile Terminating Short Messages.

The SM Mobile Terminating (SM-MT) service for a GSM/UMTS/WCDMA PLMN (N10; N11) is illustrated in FIG. 2. An interesting aspect to outline for the SM-MT service is that said short message service may involve two PLMNs, as illustrated in FIG. 2, namely, a first PLMN (N-10) owning the SC (E-010) and holding the subscription of the first MS (that is, MS-1), which originated the Short Message, and a second PLMN (N-11) in which the short message is delivered to the terminating or second Mobile Station (that is, to MS-2) (E-051). The signaling flow in accordance with FIG. 2 is as follows:

1. The SC (E-010) transfers a Short Message to an SMS Gateway Mobile Switching Centre (hereinafter: SMS-GMSC) (E-020) by means of a "Message Transfer" signaling message (S-201). The SMS-GMSC is an intermediate entity acting as an interface between the mobile network and the network providing access to the SC.

2. The SMS-GMSC (E-020) interrogates the Home Location Register (hereinafter sometimes referred to as HLR-2) (E-031) of the second PLMN (N-11) by means of a "Send Routing Information for Short Message (hereinafter SRI_SM)" signaling message (S-202) to retrieve the routing information necessary to forward the Short Message.

3. The HLR-2 (E-031) returns to the SMS-GMSC (E-020) the routing information to forward the Short Message by means of a "SRI_SM ack" signaling message (S-203).

4. The SMS-GMSC (E-020) transfers the Short Message to the Mobile Switching Center (hereinafter: MSC/VLR-2) (E-041), at which the terminating Mobile Station MS-2 (E-051) is currently located, by means of a "Forward_SM" signaling message (S-204).
5. The MSC/VLR-2 (E-041) transfers the received Short Message to the MS-2 (E-051) by means of a "Message Transfer" signaling message (S-205).
6. The MSC/VLR-2 (E-041) reports the outcome of the message transfer to the SMS-GMSC (E-020) by means of a "Forward_SM_ack" signaling message (S-206).
7. The SMS-GMSC (E-020) reports the outcome of the message transfer to the HLR-2 (E-031) by means of a "Delivery Report" signaling message (S-207).
8. The SMS-GMSC (E-020) reports the outcome of the message transfer to the SC (E-010) by means of a "Delivery Report" signaling message (S-208).

Figure 3:
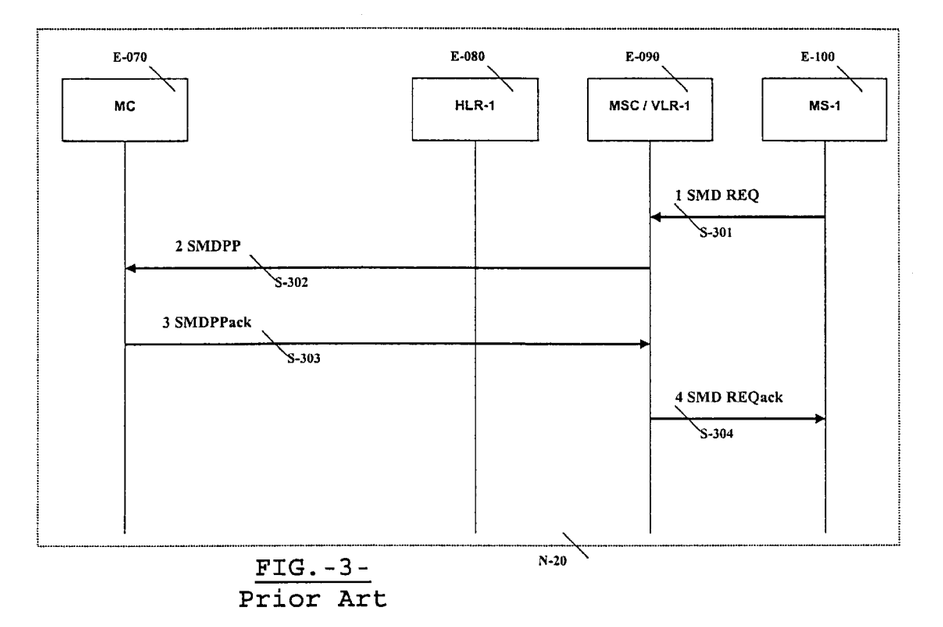
FIG. 3 illustrates a prior art Short Message related signaling flow in a TDMA/D-AMPS/CDMA2000 PLMN, for Mobile Originated Short Messages.

The SM Mobile Originated service for a TDMA/D-AMPS/CDMA2000 PLMN (N-20) is illustrated in FIG. 3. The signaling flow in accordance with FIG. 3 is as follows:

1. The Mobile Station MS-1 (E-100) transfers a Short Message to the Mobile Switching Center MSC/VLR-1 (E-090) by means of a "SMD REQ" signaling message (S-301). (As mentioned above, a Mobile Switching Center, generally speaking, might be collocated with a visitor Location Register and thus be represented as "MSC/VLR"; for the purpose of the present invention, the Mobile Switching Center is hereinafter referred to as MSC/VLR, irrespective of whether it is standalone or collocated).
2. The MSC/VLR-1 (E-090) transfers the Short Message to the Message Center MC (E-070) by means of a "SMDPP" signaling message (S-302).
3. The MC (E-070) reports the outcome of the transfer of the Short Message to the MSC/VLR-1 (E-090) by means of a "SMDPPack" signaling message (S-303).
4. The MSC/VLR-1 (E-090) reports the outcome of the transfer of the Short Message to the MS-1 (E-100) by means of a "SMD REQack" signaling message (S-304).

Figure 4:
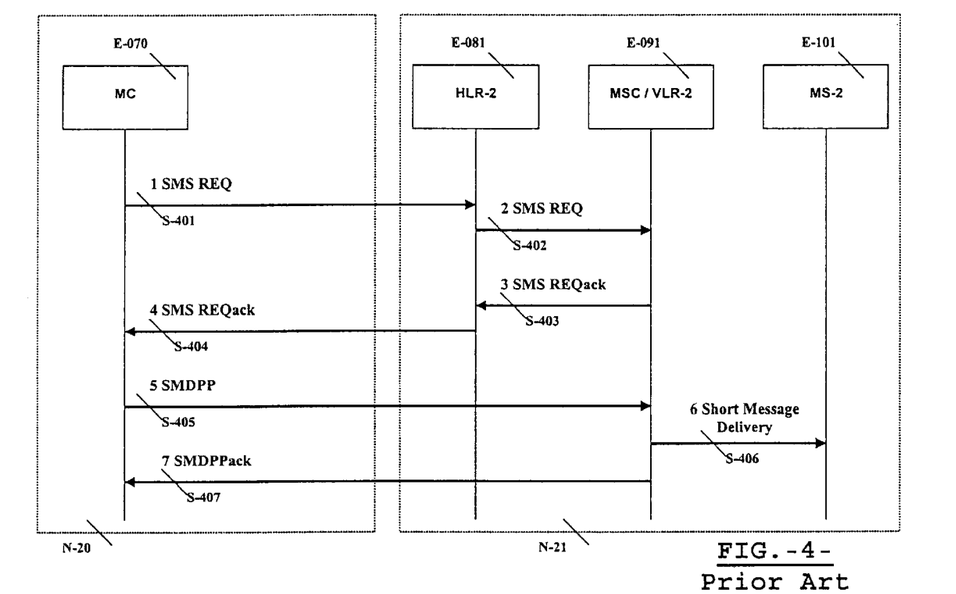
FIG. 4 illustrates a prior art Short Message related signaling flow in a TDMA/D-AMPS/CDMA2000 PLMN, for Mobile Terminating Short Messages.

The SM Mobile Terminating (SM-MT) service for a TDMA/D-AMPS/CDMA2000 PLMN is illustrated in FIG. 4. As already explained when commenting FIG. 2, the SM Mobile Terminating service may involve two PLMNs, namely, a first PLMN (N-20) owning the MC (E-070) and holding the subscription of the first MS (that is, MS-1), which originated the Short Message, and a second PLMN (N-21) in which the short message is delivered in a terminating Mobile Station (that is, MS-2) (E-101).1 The signaling flow in accordance with FIG. 4 is as follows:

1. The Message Center MC (E-070) interrogates the Home Location Register HLR-2 (E-081) of the second PLMN (N-21) by means of an "SMS REQ" signaling message (S-401) to retrieve the routing information necessary to forward the Short Message.
2. This step is optional and is executed it the HLR-2 (E-081) does not have the requested routing information. In this optional step, the HLR-2 requests the routing information necessary to forward the Short Message from the Mobile Switching Center (herein MSC/VLR-2) (E-091) by means of another "SMS REQ" signaling message (S-402) (the Mobile Switching Center MSC could be a standalone MSC or a MSC collocated with a Visitor Location Register and thus referred to as MSC/VLR, as outlined above; for the purpose of the present invention, the Mobile Switching Center is hereinafter referred to as MSC/VLR, irrespective of whether it is standalone or collocated).
3. This step is only performed when the previous optional step 2 has taken place. In this step, the MSC/VLR-2 (E-091) provides the routing information necessary to forward the Short Message to the HLR-2 (E-081) by means of an "SMS REQack" signaling message (S-403).
4. The HLR-2 (E-081) returns the routing information, required to forward the Short Message, to the MC (E-070) by means of another "SMS REQack" signaling message (S-404).
5. The MC (E-070) transfers the Short Message to the MSC/VLR-2 (E-091), at which the Mobile Station (MS-2) (E-101) is currently located, by means of an "SMDPP" signaling message (S-405).
6. The MSC/VLR-2 (E-091) transfers the Short Message to the MS-2 (E-101) by means of a "Short Message Delivery" signaling message (S-406).
7. The MSC/VLR-2 reports the outcome of the message transfer to the MC (E-070) by means of an "SMDPPack" signaling message (S-407).

As a consequence of the different messages, entities, and protocols used in the different systems, the exchange of Short Messages between a Mobile Station in one system (e.g. GSM, UMTS or, WCDMA) and another Mobile Station in a second system (e.g. TDMA, CDMA2000, UWC-136, D-AMPS or AMPS) has not been possible until now.

As already mentioned above, many essential aspects regarding interconnection of mobile networks based on different standards, and often with incompatible mechanisms, have already been solved. For instance, U.S. Pat No. 5,819,178 discloses an ISR (InterSysten Roaming) database to provide subscriber data for those subscribers who are presently roaming in a zone where the subscriber address cannot imply a Home Location Register (HLR). This situation may occur for subscribers whose subscription pertain to wireless networks based on mobile systems differing from the North American cellular telephone systems wherein they are roaming.

A further example of roaming to a network based on a different system than the one which the home network is based on, is disclosed in EP-A-0 883 318. This reference discloses how subscribers to one network based on a North American standard (such as IS-41 PLMN 9) can roam to a GSM type network comprising a satellite network. More specifically, this patent essentially deals with the means to perform the Authentication of an IS-41 PLMN 9 subscriber in his or her own network, whilst roaming to said GSM network. There is an important aspect to comment about this reference, concerning SMS: in accordance to this prior art reference, the IS-41 Challenge, which is part of the IS-41 authentication procedure, is transmitted to the handset through the satellite network, packaged as a GSM USSD or SMS. The resulting response produced at the user terminal is packaged as a GSM USSD or SMS and transmitted through the satellite network to an inter-working function unit. The usage of SMS is further mentioned as an example of what could be applied. However, the descriptions and the explanatory drawings of this prior art reference refer to the USSD as the means for such transmission.

In any case, the hypothetical usage of GSM SMS from an entity in an IS-41 PLMN 9 network does not solve the problem that is main object of the present invention, that is, the exchange of Short Messages in both directions between subscribers belonging to networks based on different standards.

Still another example of roaming to a network based on a different system than the one that the home network is based on, is disclosed in WO-A-99/57914. This reference discloses a system for providing a roaming subscriber with access to services .available in a first telephone network, when the subscriber is roaming in a second telephone network. All the signals required for the services are transmitted between said first and second telephony networks via a packet-switch network. This prior art reference deals with a subscriber from a first mobile network roaming in a second mobile network and, more specifically, with the situation in which said subscriber is turned off or busy at the time he or she receives an incoming call. In some cases, such an incoming call will be routed to a Voice Mailbox System, and the called subscriber will later be notified about the corresponding recorded message. This notification is said to be not always possible, especially when the first and the second telephony networks are not both based on GSM system. A quite extended manner of carrying out this notification is the sending of a Short Message with all the significant data to retrieve the recorded message in the VMS. In accordance to this prior art reference, both networks make use of service nodes to respectively transmit signals from the first telephony network to the packet switch network and from the packet switch network to the second telephony network. In this context, at a certain step of the method proposed by this prior art reference, the service node in the first network instructs the service node in the second network to generate and send such a Short Message with the relevant information. According to this prior art reference, the SMSC in charge of transmitting the Short Message to the roaming subscriber is the one under the home network, and also according to this prior art reference, there are technical problems involved with always achieving the expected result. As a consequence, the notification does not always arrive at the mobile station, especially when the home and the visited networks are not both of a GSM type. Once again, this prior art reference discloses the usage of Short Messages to solve other problems derived from the situation in which subscribers to a first mobile network roam in a second mobile network, both based on different standards. However, the support required for allowing the exchange of Short Messages between subscribers of mobile networks based on different standards is not disclosed in this prior art reference.

Further, there is an already existing solution that partially solves the problem of intersystem roaming between two networks. Said solution introduces a new network node known as Inter-working Location Register (hereinafter: ILR) that performs the role of a Home Location Register (HLR) towards the visited PLMN, and the role of a Visitor Location Register (VLR) towards the home PLMN. Besides, said ILR adapts functions such as mobility management (except hand-over, since the ILR is not involved in inter MSC hand-over), call handling, operation and maintenance, and supplementary services signaling procedures between the two networks.

This approach only solves Short Message delivery from the home PLMN when a subscriber is roaming in the visited PLMN. For example, let suppose that a Mobile Station (MS) from a CSM/UMTS/WCDMA PLMN roams to a TDMA/D-AMPS/CDMA2000 PLMN. In this case, the MS roaming in the TDMA/D-AMPS/CDMA2000 network will be capable to receive a Short Message generated in the GSM/UMTS/WCDMA network thanks to the ILR; but said MS will never receive a Short Message generated in the TDMA/D-AMPS/CDMA2000 network. In summary, the ILR does not permit the Short Message inter-working between two PLMS based on different standards.

Figure 5:
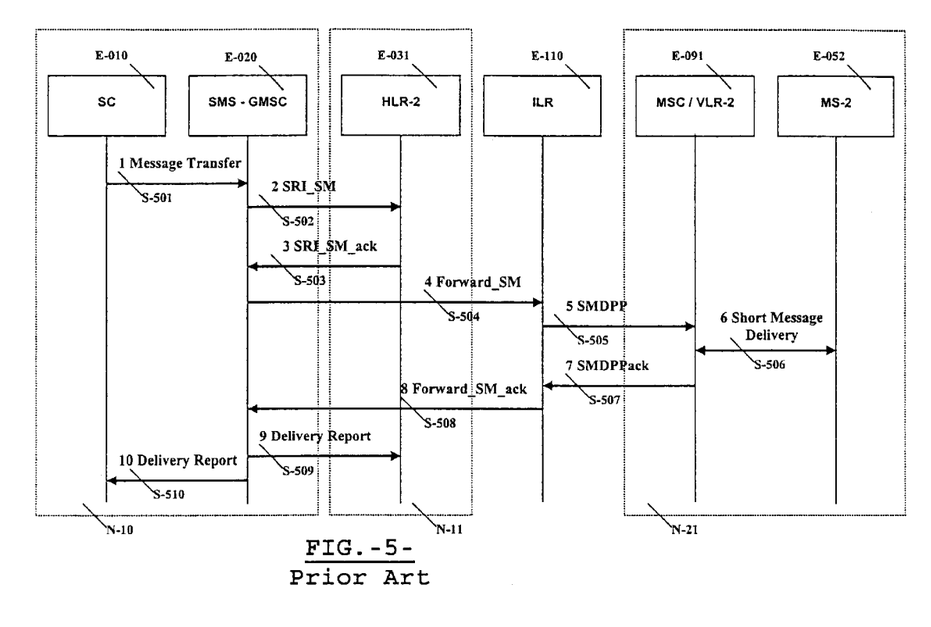
FIG. 5 illustrates a prior art Short Message related signaling flow for in a GSM/UMTS/WCDMA PLMN mobile subscriber roaming in TDMA/D-AMPS/CDMA2000 PLMN.

The ILR based method, in the case in which a Short Message originated in the GSM/UMTS/WCDMA network is sent towards a GSM/UMTS/WCDMA subscriber who is roaming to a TDMA/D-AMPS/CDMA2000 network, is illustrated in FIG. 5. This method only relates to the SM Mobile Terminating service since the SM Mobile Originated service is not affected and remains as illustrated in FIG. 1 and as discussed above. The scenario ford this SM Mobile Terminating service illustrated in FIG. 5 involves three PLMNs: a first PLMN (N10) which originated the Short Message and owns the SC (E-010), a second PLN (N-11) which holds the subscription of the subscriber to whom the Short Message was sent, and a third PLMN (N-21) in which the Short Message is delivered in a roaming Mobile Station MS-2 (E-052). The signaling flow in accordance with FIG. 5 is as follows:

1. The Service Center SC (E-010) transfers a Short Message to an SMS, Gateway Mobile Switching Center (SMS-GMSC) (E-020) by means of a "Message Transfers" signaling message (S-501).
2. The SMS-MSC (E-020) interrogates the Home Location Register HLR-2 (E-031) of the second PLMN (N-11) by means of a "Send Routing Information for Short Message" (hereinafter "SRI_SM") signaling message (S-502) to retrieve the routing information necessary to forward the Short Message.
3. The HLR-2 (E-031) returns to the SMS-CMSC (E-020) the routing information (namely, the corresponding Inter-working Location Register (ILR) address) necessary to forward the Short Message, by means of a "SRI_SM_ack" signaling message (S-503).
4. The SMS-GMSC (E-020) transfers the Short Message to the ILR (E-110) by means of a "Forward_SM" signaling message (S-504).
5. The ILR (E 110) transfers the Short Message to the Mobile Switching Center, (herein MSC/VLR-2) (E-091) of the third PLMN (N-21), at which the Mobile Station (MS-2) is currently located in the visited network, by means of a "SMDPP" signaling message (S-505).
6. The MSC/VLR-2 (E-091) transfers the Short Message to the MS-2 (E-052) by means of a "Short Message Delivery" signaling message (S-506).
7. The MSC/VLR-2 (E-091) reports the outcome of the message transfer to the ILR (E-110) by means of a "SMDPPack" signaling message (S-507).
8. The ILR (E-110) reports the outcome of the message transfer to the SMS-GMSC (E-020) by means of a "Forward_SM_ack" signaling message (S-508).
9. The SMS-GMSC (E-020) reports the outcome of the message transfer to the HLR-2 (E-031) by means of a "Delivery Report" signaling message (S-509).
10. The SMS-GMSC (E-020) reports the outcome of the message transfer to the SC (E-010) by means of a "Delivery Report" signaling message (S-510).

Anyone skilled in the art can easily understand that the opposite roaming case is also applicable: the ILR will allow that a short message originated in a TDMA/D-AMPS/CDMA2000 PLMN can be sent to and be received by a TDMA/D-AMPS/CDMA2000 subscriber who is roaming in the GMS/UMTS/WCDMA PLMN. However, this prior art reference does not solve the problem of allowing the exchange of Short Messages between subscribers of mobile networks based on different standards.

SUMMARY

Thus, the know prior art does not disclose any solution to the problem of providing Short Message Service between a first mobile station subscribed to a first PLMN, and a second mobile station subscribed to a second PLMN, when said first PLMN and said second PLMN are based on different standards, for example, when one of said PLMNs is a GSM/UMTS/WCDMA PLMN and the other PLMN is a TDMA/D-AMPS/CDMA2000 PLMN, as discussed above.

The present invention provides for a method and an apparatus intended to overcome said problem, that is, to allow Short Message Service between mobile stations subscribed to different PLMNs, also in the case in which the PLMNs are based on different standards, as outlined above.

The invention comprises a method for Short Message Service between a first mobile station (hereinafter; MS-1) subscribed to a first PLMN, and a second mobile station (hereinafter: MS-2;) subscribed to a second PLMN, wherein said first PLMN and said second PLMN may be based on different standards; for example, one of said PLMNs can be a GSM/UMTS/WCDMA PLMN and the other PLMN can be a TDMA/D-AMPS/CDMA2000 PLMN, as discussed above.

The method include the conventional step of forwarding a Mobile Originated Short Message from the first mobile station (MS-1) to a Short Message Service node of the first PLMN, and the step of forwarding a Mobile Terminating Short Message from said Short Message Service node to the second Mobile Station (MS-2).

The step of forwarding the Mobile Terminating Short Message from said Short Message Service node towards the second Mobile Station (MS-2) includes the steps of:

interrogating, from an interrogating node of the first PLMN, an Interworking Short Message Center (hereinafter: ISMC) in order to retrieve routing information necessary for forwarding the Short Message to the second Mobile Station (MS-2);

interrogating, from the ISMC, a Home Location Register (HLR) of the second PLMN and obtaining, from said HLR, routing information necessary for forwarding the Short Message to the second Mobile Station (MS-2); and forwarding said Short Message to said second Mobile Station (MS-2), using said routing information.

That is, the ISMC obtains routing information from the HLR of the second PLMN and, preferably, transmits said routing information to the interrogating node.

Subsequently, the Short Message can be forwarded from the interrogating node to the ISMC and, subsequently, from the ISMC to the appropriate MSC, in accordance with the routing information. The MSC pertains to the second PLMN if the second Mobile Station (MS-2) is currently handled by said second PLMN, that is, by the Home PLMN of the second Mobile Station. On the other hand, if the second Mobile Station is currently roaming in another PLMN (for example, in the first PLMN or in a third PLMN), the MSC will pertain to this PLMN and not to the Home PLMN.

If both PLMNs correspond to the same standard (or to standards that conventionally allow for Short Message Service between the subscribers of the different networks), the Short Message can be forwarded directly from the interrogating node to the appropriate MSC in accordance with the routing information sent to the originating node from the ISMC.

The Short Message Service node can be a Short Message Service Center (SC); this is the case when, for example, the first PLMN is a GSM/UMTS/WCDMA PLMN; in this case, the interrogating node is a Short Message Service Gateway Mobile Switching Center (SMS-GMSC).

The Short Message Service node can also be a Message Center, for example, when the first PLMN is a TDMA/D-AMPS/CDMA2000 PLMN; in this case, the interrogating node is also said Message Center (MC).

The invention also relates to an apparatus for use in mobile telecommunuication, for allowing Short Message Service between a first mobile station (MS-1) subscribed to a first PLMN, and a second mobile station (MS-2) subscribed to a second PLMN, when said first PLMN and said second PLMN are based on different standards.

The apparatus includes means for receiving, from an interrogating node of the first PLMN, a request to retrieve information necessary for forwarding the Short Message to the second Mobile Station (MS-2), and:

means for interrogating, from said apparatus, a HLR of the second PLMN in order to obtain, from said HLR, routing information necessary for forwarding the Short Message to the second Mobile Station (MS-2); and means for transmitting said routing information to the interrogating node.

The interrogating node can be a SMS-GMSC or a MC, as outlined above.

The apparatus can further includes means for receiving the Short Message from the interrogating node and means for forwarding the Short Message to a MSC using said routing information.

The apparatus, which is called Interworking Short Message Center (ISMC) in the instant specification, is thus arranged to communicate with nodes of the first as well as of the second PLMN and to transfer messages between said PLMNs. Thus, the ISMC includes means to adapt protocols, to adapt the format of Short Messages, to hold information about the PLMNs to which the subscribers belong, to adapt addresses used in the different PLMNs involved, etc. These items per se are conventional and do not require any further explanation.

Of course, when carrying out the method of the instant invention, the corresponding steps (adaptation of protocols, adaptation of formats of Short Messages, adaptation of addresses, etc.) are taken, using the ISMC, in order to facilitate the communication between the nodes and entities in the involved PLMNs.

The invention overcomes the problems referred to above, and provides for Short Message Service not only between Mobile Stations pertaining to PLMNs based on the same or similar standards (such as GSM/UMTS/WCDMA PLMNs on the one hand and TDMA/D-AMPS/CDMA2000 PLMNs on the other), but also between a MS subscribing to a GSM/UMTS/WCDMA PLMN and a MS subscribing to a TDMA/D-AMPS/CDMA2000 PLMN. That is, any subscriber to a GSM/UMTS/WCDMA PLMN will be able to send a Short Message to a subscriber to a TDMA/D-AMPS/CDMA2000 PLMN, who will be able to receive said Short Message, and vice versa.

The ISMC can be implemented in a flexible manner, in accordance with the requirements and restrictions applicable to each specific network solution. More than one ISMC can be used in a PLMN (in order to increase reliability and capacity), and an ISMC can be shared by two or more PLMNs. The ISMC can be collocated with other network functions, such as with the Signaling Relay Function (SRF).

Thus, in accordance with a first aspect of the present invention, any subscriber of a GSM/UMTS/WCDMA PLMN will be able to send Short Messages to any subscriber of a TDMA/D-AMPS/CDMA2000 PLMN, and the latter will be able to receive said Short Messages.

In accordance with a second aspect of the present invention, any subscriber of a TDMA/D-AMPS/

CDMA2000 PLMN will be able to send Short Messages to any subscriber of a GSM/UMTS/WCDMA PLMN, and the latter will be able to receive said Short Message.

In accordance with a third aspect of the present invention, any subscriber of a GSM/UMTS/WCDMA PLMN will still be able to send Short Messages to any other subscriber of said PLMN roaming in the same or in a different network, and the latter will be able to receive said Short Messages.

In accordance with a fourth aspect of the present invention, any subscriber of a TDMA/D-AMPS/CDMA2000 PLMN will still be able to send Short Messages to any subscriber of said PLMN roaming in the same or in a different network, and the latter will be able to receive said Short Messages.

When embodying the invention, it will still be possible to exchange Short Messages between subscribers of networks of a same type, without modifying the existing methods, interfaces or entities involved.

BRIEF DESCRIPTION OF THE DRAWINGS

The features, objects and advantages of the invention will become apparent by reading this description in conjunction with the accompanying drawings, in which.

DETAILED DESCRIPTION

FIGS. 6–10 have been included in order to illustrate relevant aspects of some preferred embodiments of the invention, to be described hereinafter, in an illustrative and non-restrictive manner.

First of all, it should be emphasized that the invention principally relates, to the Mobile Terminating part (SM-MT) of the Short Message Service (SMS); the Mobile originated part (SM-MO) can be performed in accordance with conventional prior art arrangements and methods, only involving the originating network (S-10; N-20) where the Short Message was, originated (namely, issued and sent) from an originating or first Mobile Station (MS-1). This part has been referred to above, in connection with FIG. 1 and FIG. 3, and is not affected by the present invention.

Now, some preferred embodiments of the invention will be described, both for SM-MT in a TDMA/D-AMPS/CDMA2000 PLMN (N-21), and SM-MT in a GSM/UMTS/WCDMA PLMN (N-11). The Short Message to be sent to the second or terminating Mobile Station MS-2 can have been originated by a first Mobile Station MS-1 subscribing to a PLMN based on a different standard than the one of the PLMN to which the MS-2 is subscribing, but it can also have been originated by a Mobile Station subscribing to a PLMN based on the same (or compatible) standard as the one of the PLMN to which the MS-2 is subscribing. The preferred embodiments described hereinafter will consider these different possibilities.

Of course, modifications can be made in the exemplary embodiments described hereinafter, without altering the general scope of the invention.

Figure 6:
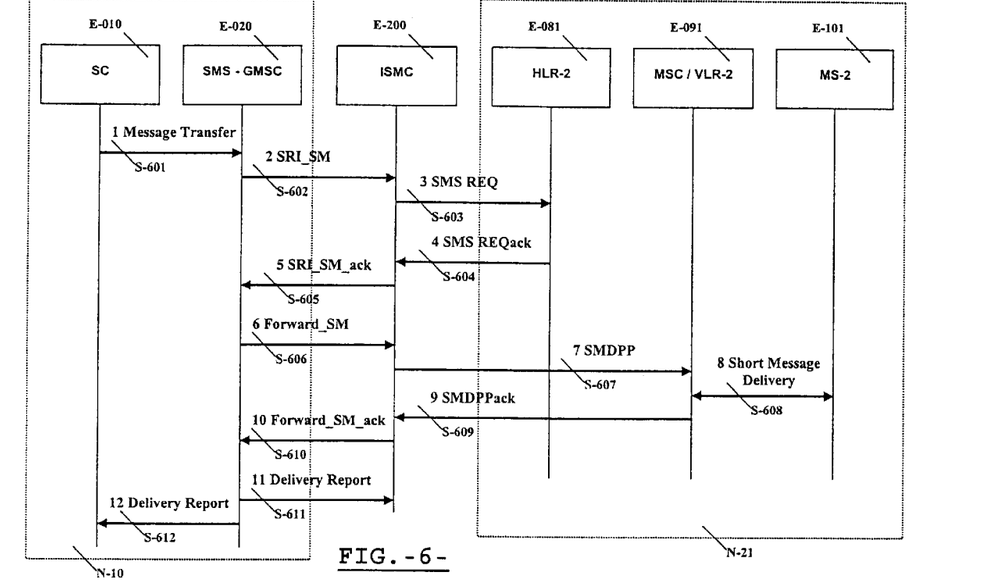
FIG. 6 illustrates a Short Message related signaling flow for forwarding a Short Message from a Service Center of a CSM/UMTS/WCDMA PLMN, towards a subscriber to a TDMA/D-AMPS/CDMA2000 PLMN, in accordance with a preferred embodiment of the invention.

FIG. 6 illustrates a Short Message related signaling flow for forwarding a Short Message from a SC of a GSM/UMTS/WCDMA PLMN (N-10), towards a Mobile Station MS-2 subscribing to a TDMA/D-AMPS/CDMA2000 PLMN (N-21), in accordance with a preferred embodiment of the invention. The signaling flow in accordance with FIG. 6 is as follows:

1. The Service Center SC (E-010) transfers a Short Message to an SMS Gateway Mobile Switching Center (hereinafter: SMS-GMSC) (E-020) by means of a "Message Transfer" signaling message (S-601).

2. The SMS-GMSC (E-020) interrogates the Interworking Short Message Center (hereinafter: ISMC) (E-200) by means of a "Send Routing Information for Short Message" (hereinafter "SRI_SM") signaling message (S-602) to retrieve the routing information necessary to forward the Short Message.

3. The ISMC (F-200) discovers that the destination second Mobile Station MS-2 (E-101) does not belong to the same PLMN (N-10) as the sender or first Mobile Station MS-1. The ISMC then interrogates the Home Location Register (hereinafter: HLR-2) (E-081) serving the PLMN (N-21) of the second Mobile Station (MS-2) (E-101) by means of an "SMS REQ" signaling message (S-603) in order to retrieve the routing information. To do this, the ISMC (E-200) makes use the corresponding protocol of the second PLMN (N-21).

4. The HLR-2 (E-081) returns the routing information to the ISMC (E-200) by means of an "SMS REQack" signaling message (S-604). Said ISMC (E-200) stores the routing information for further use. This routing information basically indicates where the addressed subscriber is currently roaming in the second PLMN.

5. The ISMC (E-200) sends back to the SMS-GMSC (E-020), the applicable ISMC-address as routing information by means of an "SRI_SM_ack" signaling message (S-605).

6. The SMS-GMSC (E-020) transfers the Short Message to the applicable ISMC (E-200) by means of a "Forward_SM" signaling message (S-606).

7. The ISMC (E-200) transfers the short message to the Mobile Switching Center (hereinafter: MSC/VLR-2) (E-091) at which the second Mobile Station MS-2 (E-101) is currently located, by means of an "SMDPP" signaling message (S-607). As commented above, said Mobile Switching Center could be standalone or collocated with a Visitor Location Register (and thus denoted MSC/VLR). For the purpose of the present invention, the Mobile Switching Center is hereinafter referred to as MSC/VLR, irrespective of whether it is standalone or collocated.

8. The MSC/VLR-2 (E-091) transfers the short message to the second Mobile Station MS-2 (E-101) by means of a "Short Message Delivery" signaling message (S-608).

9. The MSC/VLR-2 (E-091) reports the outcome of the message transfer to the ISMC (E-200) by means of an "SMDPPack" signaling message (S-609).

10. The ISMC (E-200) reports the outcome of the message transfer to the SMS-GMSC (E-020) by means of an "Forward_SM_ack" signaling message (S-610).

11. The SMS-GMSC (E-020) reports the outcome of the message transfer to the ISMC (E-200) by means of a "Delivery Report" signaling message (S-611).

12. The SMS_GMSC (E-020) reports the outcome of the message transfer to the originating Service Center SC (E-010) by means of a "Delivery Report" signaling message (S-612).

In accordance with another preferred embodiment based on the environment illustrated in FIG. 6, the steps 3 and 4 illustrated in said FIG. 6 can be performed after the reception of the "Forward_SM" signaling message (S-606) illustrated in FIG. 6 (cf step 6 referred to above). This and another modifications can be introduced without modifying the scope of the invention.

Figure 7:
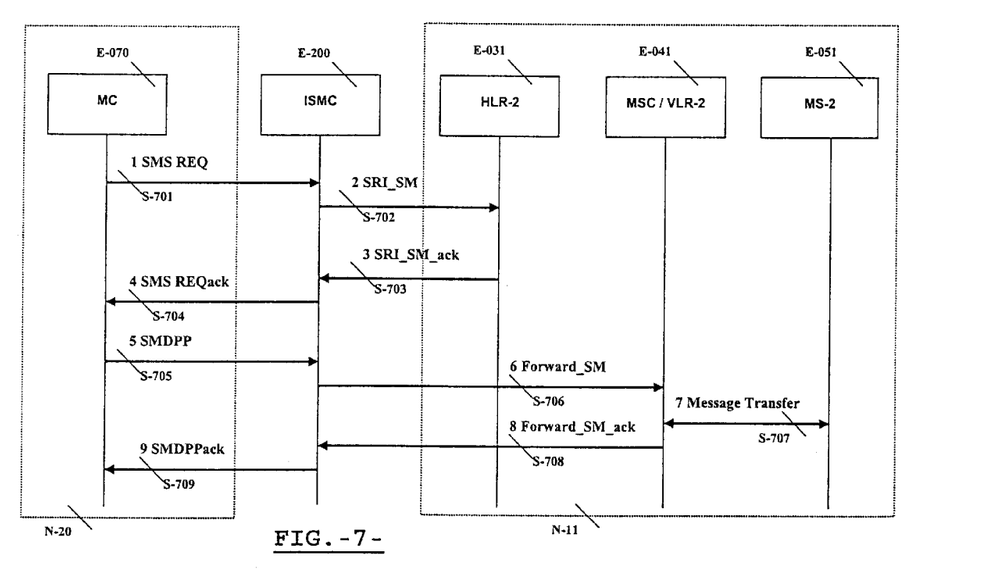
FIG. 7 illustrates a Short Message related signaling flow for forwarding a Short Message from a Message Center of a TDMA/D-AMPS/CDMA2000 PLMN, towards a subscriber to a GSM/UMTS/WCDMA PLMN, in accordance with a preferred embodiment of the invention.

FIG. 7 illustrates a Short Message related signaling flow for forwarding a Short Message from a Message Center of a TDMA/D-AMPS/CDMA2000 PLMN (N-20), towards a subscriber to a GSM/UMTS/WCDMA PLMN (N-11), in accordance with a preferred embodiment of the invention. The signaling flow in accordance with FIG. 7 is as follows:

1. The Message Center MC (E-070) of the first PLMN (N-20) interrogates the Inter-working Short Message Center (hereinafter: ISMC) (E-200) by means of an "SMS REQ" signaling message (S-701) to retrieve the routing information necessary to forward the Short Message.

2. The ISMC (E-200) interrogates the Home Location Register (hereinafter: HLR-2) (E-031) of the second PLMN (N-11) by means of an "Send Routing Information for Short Message" (hereinafter: "SRI_SM") signaling message (S-702) to retrieve the information necessary to forward the Short Message.

3. The HLR-2 (E-031) returns the routing information to the ISMC (E-200) by means of an "SRI_SM_ack" signaling message (S-703).

4. The ISMC (E-200) sends back to the Message Center MC (E-070) the ISMC-address as routing information, by means of an "SMS REQack" signaling message (S-704).

5. The MC (E-070) transfers the short message to the ISMC (E-200) by means of an "SMDPP" signaling message (S-705).

6. The ISMC (E-200) transfers the Short Message to the Mobile Switching Center (hereinafter: MSC/VLR-2) (E-041) of the second PLMN (N-11), at which the Mobile Station (MS-2) is currently located, by means of a "Forward_SM" signaling message (S-706). For the purpose of the present invention, the Mobile Switching Center is hereinafter referred to as MSC/VLR, irrespective of whether it is standalone or collocated.

7. The MSC/VLR-2 (E-041) transfers the short message to the second Mobile Station MS-2 (E-051) by means of a "Message Transfer" signaling message (S-707).

8. The MSC/VLR-2 (E-041) reports the outcome of the message transfer to the ISMC (E-200) by means of a "Forward_SM_ack" signaling message (S-708).

9. The ISMC (E-200) reports the outcome of the message transfer to the MC (E-070) by means of an "SMDP-Pack" signaling message (S-709).

Figure 8:
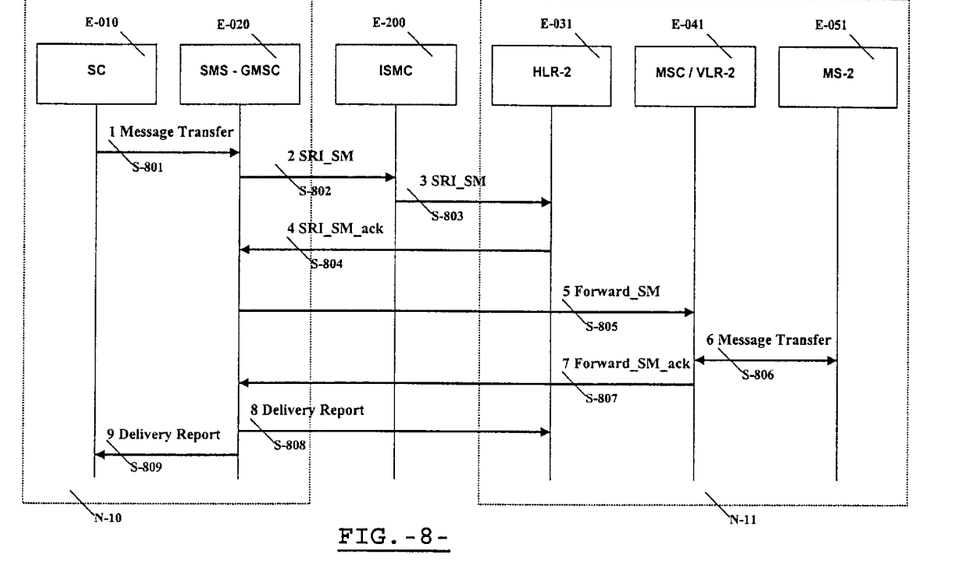
FIG. 8 illustrates a Short Message related signaling flow in GSM/UMTS/WCDMA PLMNs, for Mobile Terminating Short Messages, in accordance with a preferred embodiment of the invention.

FIG. 8 illustrates a Short Message related signaling flow for SM-MT in a GSM/UMTS/WCDMA PLMN, wherein the Short Message has been originated by a MS subscribing to the same or another GSM/UMTS/WCDMA PLMN. The signaling flow in accordance with FIG. 8 is as follows:

1. The Service Center SC (E-010) transfers a Short Message to an SMS Gateway Mobile Switching Center (hereinafter: SMS-GMSC) (E-020) by means of a "Message Transfer" signaling message (S-801).

2. The SMS-GMSC (E-020) interrogates the Inter-working Short Message Center (hereinafter: ISMC) (E-200) by means of a "Send Routing Information for Short Message" (hereinafter: "SRI_SM") signaling message (S-802) to retrieve the routing information necessary to forward the Short Message.

3. The ISMC (E-200) discovers that the destination or second Mobile Station (hereinafter: MS-2) (E-051) belongs to a PLMN (N-11) of a same type as, or compatible with, the PLMN (N-10) of the sender or first Mobile Station (MS-1) (E-050, not illustrated in FIG. 8). Said ISMC relays the received "SRI_SM" signaling message (S-803) towards the corresponding Home Location Register (hereinafter: HLR-2) (E-031) in order to obtain the routing information. To achieve said relay, the ISMC does not change the Calling Party Address in the "SRI_SM" signaling message (S-802) received from the SMS-GMSC (E-020) (namely, the SMS-GMSC-address) when said SRI_SM signaling message (S-803) is relayed to HLR-2.

4. The HLR-2 (E-031) returns the routing information to the SMS-GMSC (E-020) —as indicated by the Calling Party Address in the received "SRI_SM" signaling message (S-803)—by means of an "SRI_SM_ack" signaling message (S-804)

5. The SMS-GMSC (E-020) transfers the Short Message to the Mobile Switching Center (hereinafter: MSC/VLR-2) (E-041), at which the second Mobile Station (MS-2) (E-051) is currently located, by means of a "Forward_SM" signaling message (S-805). For the purpose of the present invention, the Mobile Switching Center is hereinafter referred to as MSC/VLR, irrespective of whether it is standalone or collocated.

6. The MSC/VLR-2 (E-041) transfers the Short Message to the Mobile Station (MS-2) (E-051) by means of a "Message Transfer" signaling message (S-806).

7. The MSC/VLR-2 (E-041) reports the outcome of the message transfer to the SMS-GMSC (E-020) by means of a "Forward_SM_ack" signaling message (S-807).

8. The SMS-GMSC (E-020) reports the outcome of the message transfer to the HLR-2 (E-031) by means of a "Delivery Report" signaling message (S-808) The SMS-GMSC is able to access the HLR-2 by means of routing information that had been previously received in the "SRI_SM_ack" signaling message (S-804).

9. The SMS_GMSC (E-020) reports the outcome of the message transfer to the SC (E-010) by means of a "Delivery Report" signaling message (S-809).

Figure 9:
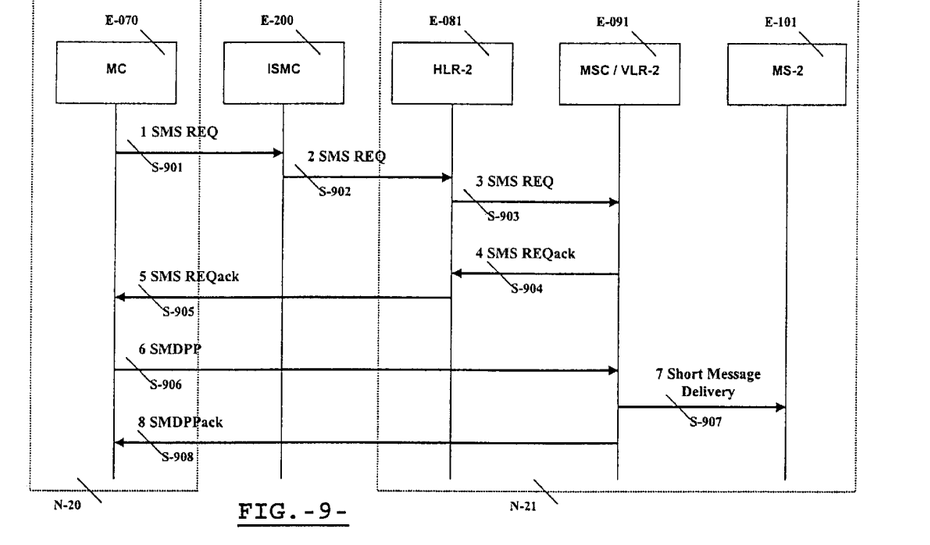
FIG. 9 illustrates a Short Message related signaling flow in TDMA/D-AMPS/CDMA2000 PLMNs, for Mobile Terminating Short Messages, in accordance with a preferred embodiment of the invention.
Figure 10:
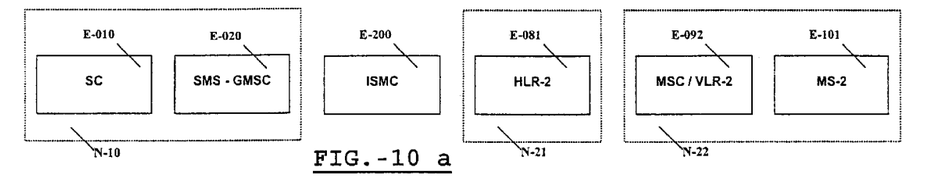
FIG. 10a, FIG. 10b, FIG. 10c and FIG. 10d schematically illustrate relevant entities involved with Short Message signaling, in environments comprising three different PLMNs.

FIG. 9 illustrates a Short Message related signaling flow for SM-MT in a TDMA/D-AMPS/CDMA2000 PLMN, wherein the Short Message has been originated by a MS subscribing to the same or another TDMA/D-AMPS/CDMA2000 PLMN, The signaling flow in accordance with FIG. 9 is as follows:

1. The Message Center MC (E-070) interrogates the ISMC (E-200) by means of an "SMS REQ" signaling message (S-901) to retrieve the information necessary to forward the Short Message.
2. The ISMC (E-200) discovers that the destination or second Mobile Station (herein MS-2) (E-101) belongs to a PLMN (N-21) of a same type as, or compatible with, the PLMN (N-20) of the sender or first Mobile Station (MS-1) (E-100, not illustrated in FIG. 9). Said ISMC relays such a received "SMS REQ" signaling message (S-902) towards the corresponding Home Location Register HLR-2 (E-081) of the PLMN (N-21) of the MS-2, in order to obtain the routing information. To achieve said relay, the ISMC does not change the Calling Party Address in the "SMS REQ" signaling message (S-901) received from the MC (E-070) (namely the MC-address) when said "SMS REQ" signaling message (S-902) is relayed to HLR-2.
3. This step is optional and is executed if the HLR-2 (E-081) does not have the requested routing information. The HLR-2 requests the routing information necessary to forward the Short Message from the Mobile Switching Center (hereinafter: MSC/VLR-2) (E-091) by means of another "SMS REQ" signaling message (S-903). For the purpose of the present invention, the Mobile Switching Center is hereinafter referred to as MSC/VLR, irrespective of whether it is standalone or collocated.
4. This step is only performed when the previous optional step 3 has taken place. The MSC/VLR-2 (E-091) provides the routing information necessary to forward the Short Message to the HLR-2 (E-081) by means of an "SMS REQack" signaling message (S-904).
5. The HLR-2 (E-081) returns the routing information, required to forward the Short Message, to the Message Center MC (E-070)—as indicated by the Calling Party Address in the received "SMS REQ" signaling message (S-902)—by means of another "SMS REQack" signaling message (S-905).
6. The MC (E-070) transfers the short message to the MSC/VLR-2 (E-091), at which the second Mobile Station (MS-2) (E-101) is currently located, by means of an "SMDPP" signaling message (S-906).
7. The MSC/VLR-2 (E-091) transfers the Short Message to the MS-2 (E-101) by means of a "Short Message Delivery" signaling message (S-907).
8. The MSC/VLR-2 (E-091) reports the outcome of the message transfer to the MC (E-070) by means of an "SMDPPack" signaling message (S-908).

The embodiments illustrated in FIG. 6, FIG. 7, FIG. 8, and FIG. 9, have been described in simplified scenarios, and in a non-restrictive manner. In this respect, other network configurations or subscriber roaming conditions might lead to different scenarios than the ones that are illustrated in said FIGS. 6–9, without altering the scope of the present invention.

More specifically, the method and signaling flow presented in FIG. 6 for a given network configuration (N-10, N-21) will not be substantially modified when applying the scenario and roaming conditions presented in FIG. 10a: the signaling flow illustrated in FIG. 6 will still be valid for a second Mobile Station MS-2 (E-101), with subscription in a HLR-2 (E-081) of a home PLMN (N-21), and currently roaming in a Mobile Switching Center MSC/VLR-2 (E-092) of a visited PLMN (N-22). In the scenario illustrated in FIG. 10a, said home and visited PLMNs are of the same type or compatible with each other.

Still another scenario is illustrated in FIG. 10b. The signaling flow illustrated in FIG. 7 for a given PLMN configuration (N-20, N-11) will not be substantially modified when applying the scenario and roaming conditions illustrated in FIG. 10b. Said signaling flow in FIG. 7 will still be valid for a second Mobile Station MS-2 (E-051), with subscription in a HLR-2 (E-031) of a home PLMN (N-11), and currently roaming in a Mobile Switching Center MSC/VLR-2 (E-042) of a visited PLMN (N-12). In the scenario illustrated in FIG. 10b, said home and visited PLMNs are of the same type or compatible with each other.

A further scenario is presented in FIG. 10c. The method and signaling flow illustrated in FIG. 8 for a given network configuration (N-10, N-11) will not be substantially modified when applying the scenario and roaming conditions illustrated in FIG. 10c. Said signaling flow in FIG. 8 will still be valid for a second Mobile Station MS-2 (E-051), with subscription in a HLR-2 (E-031) of a home PLMN (N-11), and currently roaming in a Mobile Switching Center MSC/VLR-2 (E-042) of a visited network (N-12). In the scenario illustrated in FIG. 10c, said home and visited PLMNs are of the same type or compatible with each other.

A still further scenario is illustrated in FIG. 10d. The method and signaling flow illustrated in FIG. 9 for a given network configuration (N-20, N-21) will not be substantially modified when applying the scenario and roaming conditions illustrated in FIG. 10d. Said signaling flow in FIG. 9 will still be valid for a Mobile Station MS-2 (E-101), with subscription in a HLR-2 (E-081) of a home network (N-21), and currently roaming in a Mobile Switching Center (MSC/VLR-2) (E-092) of a visited network (N-22). In the scenario illustrated in FIG. 10c, said home and visited PLMNs are of the same type or compatible with each other.

What is claimed is:

1. A method for forwarding a Mobile Terminating Short Message from a Short Message Service node of a first Public Land Mobile Network, where the Short Message originated by a first mobile station is stored, to a second mobile station subscribed to a second Public Land Mobile Network, wherein said first Public Land Mobile Network and said second Public Land Mobile Network may be based on different standards, wherein the method includes the steps of:

having the Short Message at an interrogating node of the first Public Land Mobile Network able to communicate with the second Public Land Mobile Network;

interposing an Inter-working Short Message Center between the interrogating node of the first Public Land Mobile Network and the second Public Land Mobile Network;

interrogating, from the interrogating node of the first Public Land Mobile Network, the Inter-working Short Message Center in order to retrieve routing information necessary for forwarding the Short Message to the second mobile station;

interrogating, from the Inter-working Short Message Center, a Home Location Register of the second Public Land Mobile Network and obtaining from said Home Location Register routing information necessary for forwarding the Short Message to the second mobile station; and forwarding said Short Message to said second mobile station, using said routing information.

2. A method according to claim 1, wherein the Interworking Short Message Center obtains routing information from the Home Location Register of the second Public Land Mobile Network and transmits said routing information to the interrogating node.

3. A method according to claim 1, wherein the Short Message is forwarded from the interrogating node to the Interworking Short Message Center and from the Interworking Short Message Center to a Mobile Switching Center in accordance with the routing information.

4. A method according to claim 1, wherein the Short Message Service node is a Short Message Service Center and the interrogating node is a Short Message Service Gateway Mobile Switching Center.

5. A method according to claim 4, wherein the first Public Land Mobile Network is a GSM/UMTS/WCDMA Public Land Mobile Network.

6. A method according to claim 5, wherein the second Public Land Mobile Network is a TDMA/D-AMPS/CDMA2000 Public Land Mobile Network.

7. A method according to claim 1, wherein the Short Message Service node is a Message Center and the interrogating node is also said Message Center.

8. A method according to claim 7, wherein the first Public Land Mobile Network is a TDMA/D-AMPS/CDMA2000 Public Land Mobile Network.

9. A method according to claim 8, wherein the second Public Land Mobile Network is a GSM/UMTS/WCDMA Public Land Mobile Network.

10. An apparatus for use in mobile telecommunication for forwarding a Mobile Terminating Short Message from a Short Message Service node of a first Public Land Mobile Network, where the Short Message originated by a first mobile station is stored, to a second mobile station subscribed to a second Public Land Mobile Network, when said first Public Land Mobile Network and said second Public Land Mobile Network are based on different standards, wherein the apparatus is interposed between an interrogating node of the first Public Land Mobile Network and the second Public Land Mobile Network, and the apparatus includes:

means for receiving, from the interrogating node of the first Public Land Mobile Network, a request to retrieve information necessary for forwarding the Short Message to the second Mobile Station;

means for interrogating, from said apparatus, a Home Location Register of the second Public Land Mobile Network in order to obtain, from said Home Location Register, routing information necessary for forwarding the Short Message to the second Mobile Station; and means for transmitting said routing information to the interrogating node.

11. An apparatus according to claim 10, wherein the apparatus further includes means for receiving the Short Message from the interrogating node and means for forwarding the Short Message to a Mobile Switching Center using said routing information.

12. An apparatus according to claim 10, wherein the interrogating node of the first Public Land Mobile Network is a Gateway Mobile Switching Center for Short Message Services (SMS-GMSC) of said first Public Land Mobile Network.

13. An apparatus according to claim 12, wherein the first Public Land Mobile Network is a GSM/UMTS/WCDMA Public Land Mobile Network.

14. An apparatus according to claim 13, wherein the second Public Land Mobile Network is a TDMA/D-AMPS/CDMA2000 Public Land Mobile Network.

15. An apparatus according to claim 10, wherein the interrogating node of the first Public Land Mobile Network is a Message Center and the Short Message Service node is also said Message Center of said first Public Land Mobile Network.

16. An apparatus according to claim 15, wherein the first Public Land Mobile Network is a TDMA/D-AMPS/CDMA2000 Public Land Mobile Network.

17. An apparatus according to claim 16, wherein the second Public Land Mobile Network is a GSM/UMTS/WCDMA Public Land Mobile Network.

* * * * *